June 18, 1940.                J. T. NEWBERRY                2,205,150
                                CHECK VALVE
                            Filed Aug. 14, 1939
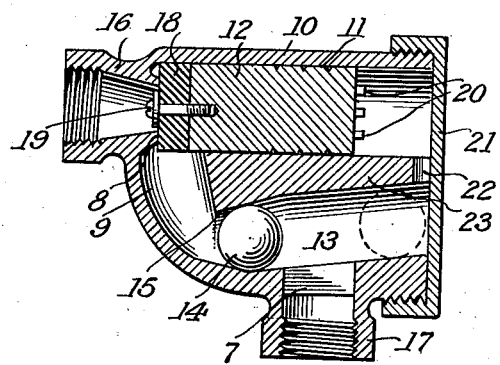
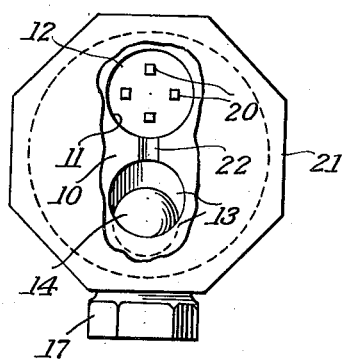
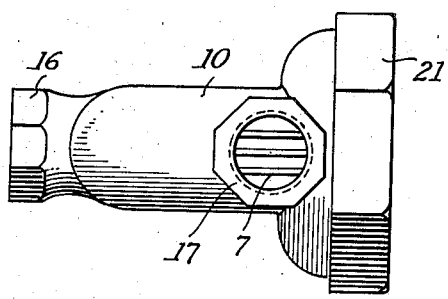
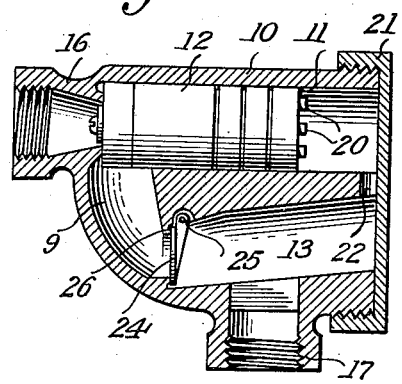
John T. Newberry
INVENTOR
BY Victor J. Evans & Co.
ATTORNEYS Patented June 18, 1940

2,205,150

UNITED STATES PATENT OFFICE 2,205,150

CHECK VALVE

John T. Newberry, Memphis, Tenn.

Application August 14, 1939, Serial No. 290,101

3 Claims. (Cl. 277—70)

This invention relates to check valves, more particularly to air check valves, and has for an object to provide a check valve structure having an auxiliary check valve for positively closing the main check valve automatically without noise.

Conventional air check valves either knock and make so much noise that they are objectionable, or else they leak back and cause the air compressor to run excessively, become overheated, and waste electric current.

With the above in mind it is a further object of the invention to provide a check valve structure which will positively cut off the air after the compressor stops pumping, which will eliminate the chatter of pulsing valves, and which will eliminate wear on the valve seat so that long life of the valve structure is promoted.

A further object is to provide a device of this character which may be formed of a few simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view of a check valve structure constructed in accordance with the invention and showing the main valve and the auxiliary valve dotted in open positions.

Figure 2 is an end elevation of the device shown in Figure 1 with part of the closure gap broken away to expose the main check valve and the auxiliary check valve.

Figure 3 is a bottom plan view of the device shown in Figure 1.

Figure 4 is a longitudinal and sectional view of a modified form of the invention having an auxiliary valve of gate type.

Referring now to the drawing in which like characters of reference designate similar parts in the various views, 10 designates a check valve housing having an upper longitudinal cylindrical opening 11 to receive a main check valve 12 of the plunger type. The casing is provided also with a lower longitudinal opening 13, inclined obliquely upward relatively to the opening 11, to provide a runway for an auxiliary ball check valve 14. The front end of the opening 13 is constricted, to provide a seat 15 for the auxiliary check valve. Beyond the seat a passage 9 is found in the housing and establishes communication between the front ends of both openings. A seat 8 for the main check valve 12 is formed in the housing at the top of the opening 9 so that the main check valve seals both openings when closed.

The housing is provided with an air inlet nipple 16 which communicates with the opening 11 in which the main check valve 12 reciprocates. The housing is also equipped with an air outlet nipple 17 disposed intermediate the ends of the sloped opening 13 in which the auxiliary ball check valve 14 reciprocates. The outlet nipple is provided with spaced bars 7 which permit the ball rolling downward and upward thereupon over the entrance of the nipple. The outlet nipple 17 is adapted to be connected to an air storage tank while the inlet nipple 16 is adapted to be connected to a conventional air compressor.

The main check valve 12 is provided at its front end with a packing washer 18, which is secured to the valve by a screw 19, and seals the inlet nipple 16 when the valve is closed. The main check valve is also provided on its rear end face with a plurality of spaced pins 20 which are adapted to engage a closure cap 21, which closes both valve openings in the housing, and space the check valve from the cap when the valve is open. A passage 22 is formed in the division wall 23 which separates the valve openings 11 and 13 of the housing and this passage establishes unobstructed communication between the rear ends of both valve openings at all times.

In operation, air from the compressor enters the nipple 16 and forces the main check valve 12 open to unseal the passage 9. Compressed air then forces open the auxiliary check valve 14 and enters the air storage tank through the nipple 17. As soon as the compressor stops a pumping stroke the ball check valve 14 closes by gravity and air pressure from the tank passes through the nipple 17 into the opening 13 and holds the valve closed. The air pressure then passes through the passage 22 into the opening 11 and is exerted against the rear face of the main check valve 12 to close the valve.

The valve structure is automatic in operation, and in practice and it has been found not to hammer or pulsate each time the compressor pulsates, and thus is noiseless.

In Figure 4 there is shown a modified form of the invention in which a gate valve 24 is employed instead of a ball valve. The gate valve is in the nature of a disc which is hinged at the top, through the medium of a pivot pin 25 to the division wall of the housing. The valve seats against an annular seat 26 formed in the constricted end of the inclined opening in the housing. Since all the other parts of the modified form of invention are identical with the parts of the first described form of the invention they have been given the identical reference numerals. Obviously no space bars corresponding to the spaced bars 7 of the first described form of the invention are necessary in the modified form of the invention.

From the above description it is thought that the construction and operation of the invention will be fully understood without further explanation.

What is claimed is:

1. A check valve structure adapted to be inserted in a line from an air compressor to a storage tank comprising, a housing having an upper and a lower longitudinal opening, and having front and rear passages connecting the openings at both ends, the lower opening being inclined downwardly and forwardly relatively to the upper opening, a plunger check valve in the upper opening seating at the front end of the opening and adapted to be opened by air compressor pressure, said plunger check valve in open position unsealing the front passage and in closed position sealing the front passage, and an auxiliary check valve in the lower opening seating at the lowest point in the opening and adapted to be forced open when the front passage is unsealed and adapted to close by gravity and permit back pressure from the tank escaping through the lower opening and rear passage into the upper opening to act against the rear face of the plunger check valve and close the valve.

2. A check valve structure comprising a housing having an upper and a lower longitudinal opening, and having front and rear passages connecting the openings at both ends, the lower opening being inclined downwardly and forwardly relatively to the upper opening, an air inlet nipple on the housing connected to the front end of the upper opening, an air outlet nipple on the housing connected to the lower opening intermediate the ends of the opening, a plunger check valve in the upper opening seating at the front end of the opening, said plunger check valve in open position unsealing the front passage and in closed position sealing the front passage, and a ball check valve in the lower opening seating at the lowest point in the opening and adapted to be forced open to a position above said outlet nipple when the front passage is unsealed and adapted to close by gravity and permit back pressure from the outlet nipple being exerted through the rear passage against the rear face of the plunger check valve to close the valve.

3. A check valve structure comprising a housing having an upper and a lower longitudinal opening, and having front and rear passages connecting the openings at both ends, the lower opening being inclined downwardly and forwardly relatively to the upper opening, an air inlet nipple on the housing connected to the front end of the upper opening, an air outlet nipple on the housing connected to the lower opening intermediate the ends of the opening, a plunger check valve in the upper opening seating at the front end of the opening, said plunger check valve in open position unsealing the front passage and in closed position sealing the front passage, and a gate valve hinged at the top to the top of the lower opening at the front end of the opening and adapted to be forced open when the front passage is unsealed and adapted to close by gravity and permit back pressure from the outlet nipple being exerted through the rear passage against the rear face of the plunger check valve to close the valve.

JOHN T. NEWBERRY.